US011680501B2

(12) United States Patent
Scarf

(10) Patent No.: US 11,680,501 B2
(45) Date of Patent: Jun. 20, 2023

(54) INTERNAL COMBUSTION ENGINE AND CRANKCASE VENTILATION SYSTEM

(71) Applicant: DEERE & COMPANY, Moline, IL (US)

(72) Inventor: Randy R. Scarf, Gladbrook, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/448,229

(22) Filed: Sep. 21, 2021

(65) Prior Publication Data

US 2023/0086242 A1 Mar. 23, 2023

(51) Int. Cl.

*F01M 13/04* (2006.01)
*F01M 13/02* (2006.01)
*F01M 13/00* (2006.01)
*F02B 37/00* (2006.01)

(52) U.S. Cl.

CPC ........ *F01M 13/04* (2013.01); *F01M 13/0011* (2013.01); *F01M 13/028* (2013.01); *F02B 37/005* (2013.01)

(58) Field of Classification Search

CPC .. F01M 13/04; F01M 13/0011; F01M 13/028; F02B 37/005

See application file for complete search history.

(56) References Cited

U.S. PATENT DOCUMENTS

| | | | | | |
|---|---|---|---|---|---|
| 2,277,471 | A * | 3/1942 | Wydler | F02C 3/02 | 60/397 |
| 5,803,025 | A * | 9/1998 | Feucht | F01M 13/04 | 123/41.86 |
| 7,162,872 | B2 * | 1/2007 | Schmid | F01N 3/225 | 415/206 |
| 7,712,456 | B2 * | 5/2010 | Hirano | F01M 13/021 | 123/572 |
| 2004/0040442 | A1 * | 3/2004 | Franzen | F01M 13/04 | 55/405 |
| 2006/0196482 | A1 * | 9/2006 | Kakimoto | F02M 25/06 | 123/519 |
| 2009/0025662 | A1 * | 1/2009 | Herman | F01M 13/04 | 123/41.86 |
| 2010/0051388 | A1 * | 3/2010 | Clark | B01D 46/30 | 184/6.24 |

(Continued)

FOREIGN PATENT DOCUMENTS

| | | | | |
|---|---|---|---|---|
| CN | 111594296 A * | 8/2020 | F01M 13/022 |
| EP | 3290667 A1 * | 3/2018 | F01M 13/00 |

*Primary Examiner* — Kurt Philip Liethen

(57) ABSTRACT

An internal combustion engine includes a block containing a crankshaft and a crankcase surrounding the crankshaft, a plurality of combustion chambers configured to receive an intake fluid and generate exhaust fluid, an exhaust circuit configured to direct the exhaust fluid away from the plurality of combustion chambers, an intake circuit configured to supply the intake fluid to the plurality of combustion chambers, a turbine disposed in the exhaust circuit and having a turbine shaft configured to be driven by the exhaust fluid, a crankcase ventilation circuit configured to direct crankcase fluid away from the crankcase, and a pump disposed in the crankcase ventilation circuit and having a rotor configured to be driven by the turbine shaft to propel the crankcase fluid through the crankcase ventilation circuit.

20 Claims, 5 Drawing Sheets

(56) References Cited

U.S. PATENT DOCUMENTS

2014/0165977 A1 * 6/2014 Copley .................. B01D 45/16
123/573
2015/0082790 A1 * 3/2015 Yoshioka ......... F02M 35/10281
60/605.2

* cited by examiner

INTERNAL COMBUSTION ENGINE AND CRANKCASE VENTILATION SYSTEM

BACKGROUND

Internal combustion engines may generate blowby gas during engine operation such as by intake air and exhaust gases traveling past piston rings, stem seals, compressor or turbine seals, or other engine components. Gaseous crankcase fluid, include blowby gas, is mostly contained in the crankcase where its pressure may be regulated using an open or closed crankcase ventilation system. In an open crankcase ventilation system, the crankcase fluid may be ventilated out of the engine to regulate crankcase pressure. In a closed crankcase ventilation system, the crankcase fluid may be ventilated into an intake air circuit or another location having a pressure below the pressure of the crankcase fluid such that the crankcase fluid is reintroduced to the engine.

SUMMARY

Various aspects of examples of the present disclosure are set out in the claims.

In an embodiment of the present disclosure, an internal combustion engine includes a block containing a crankshaft and a crankcase surrounding the crankshaft, a plurality of combustion chambers configured to receive an intake fluid and generate exhaust fluid, an exhaust circuit configured to direct the exhaust fluid away from the plurality of combustion chambers, an intake circuit configured to supply the intake fluid to the plurality of combustion chambers, a turbine disposed in the exhaust circuit and having a turbine shaft configured to be driven by the exhaust fluid, a crankcase ventilation circuit configured to direct crankcase fluid away from the crankcase, and a pump disposed in the crankcase ventilation circuit and having a rotor configured to be driven by the turbine shaft to propel the crankcase fluid through the crankcase ventilation circuit.

The engine may further include a compressor disposed in the intake circuit propelling the intake fluid to the plurality of combustion chambers. The engine may further include a crankcase ventilation circuit outlet disposed at the intake circuit downstream from the compressor such that the crankcase fluid is propelled from the crankcase to the intake circuit through the crankcase ventilation circuit. The engine may further include a separator disposed in the crankcase ventilation circuit and configured to remove a lubricant from the crankcase fluid as the crankcase fluid is directed through the crankcase ventilation circuit. The separator may be disposed upstream of the pump in the crankcase ventilation circuit. The engine may further include a regulator disposed in the crankcase ventilation circuit and configured to regulate the pressure of the crankcase fluid in the crankcase. The regulator may be disposed upstream of the pump in the crankcase ventilation circuit. The engine may further include a check valve disposed in the crankcase ventilation circuit and configured to prevent a reverse flow direction of the crankcase fluid from the crankcase ventilation circuit outlet toward the pump. The check valve may be disposed downstream of the pump in the crankcase ventilation circuit. The engine may further include a crankcase ventilation circuit outlet disposed at the exhaust circuit downstream of the turbine such that the crankcase fluid is propelled from the crankcase to the exhaust circuit through the crankcase ventilation circuit.

In an embodiment of the present disclosure, a crankcase ventilation system is configured to ventilate a crankcase in an internal combustion engine having a turbine. Th crankcase ventilation system includes a crankcase ventilation circuit configured to direct crankcase fluid away from the crankcase, a pump disposed in the crankcase ventilation circuit and being configured to be driven by the turbine to propel the crankcase fluid through the crankcase ventilation circuit, a check valve disposed in the crankcase ventilation circuit downstream of the pump and being configured to prevent a reverse flow direction of the crankcase fluid toward the pump, and a separator disposed in the crankcase ventilation circuit and configured to remove a lubricant from the crankcase fluid as the crankcase fluid is directed through the crankcase ventilation circuit.

The separator may be disposed in the crankcase ventilation circuit upstream of the pump. The system may further include a crankcase ventilation circuit outlet configured to be positioned at an intake circuit downstream of a compressor propelling an intake fluid in the intake circuit, wherein the crankcase fluid may be propelled from the crankcase to the intake circuit through the crankcase ventilation circuit. The system may further include a crankcase ventilation circuit outlet configured to be positioned at an exhaust circuit downstream of the turbine, wherein the crankcase fluid may be configured to be propelled from the crankcase to the exhaust circuit through the crankcase ventilation circuit.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one embodiment of the subject matter of this disclosure is understood by referring to FIGS. 1 through 5 of the drawings.

Figure 1:
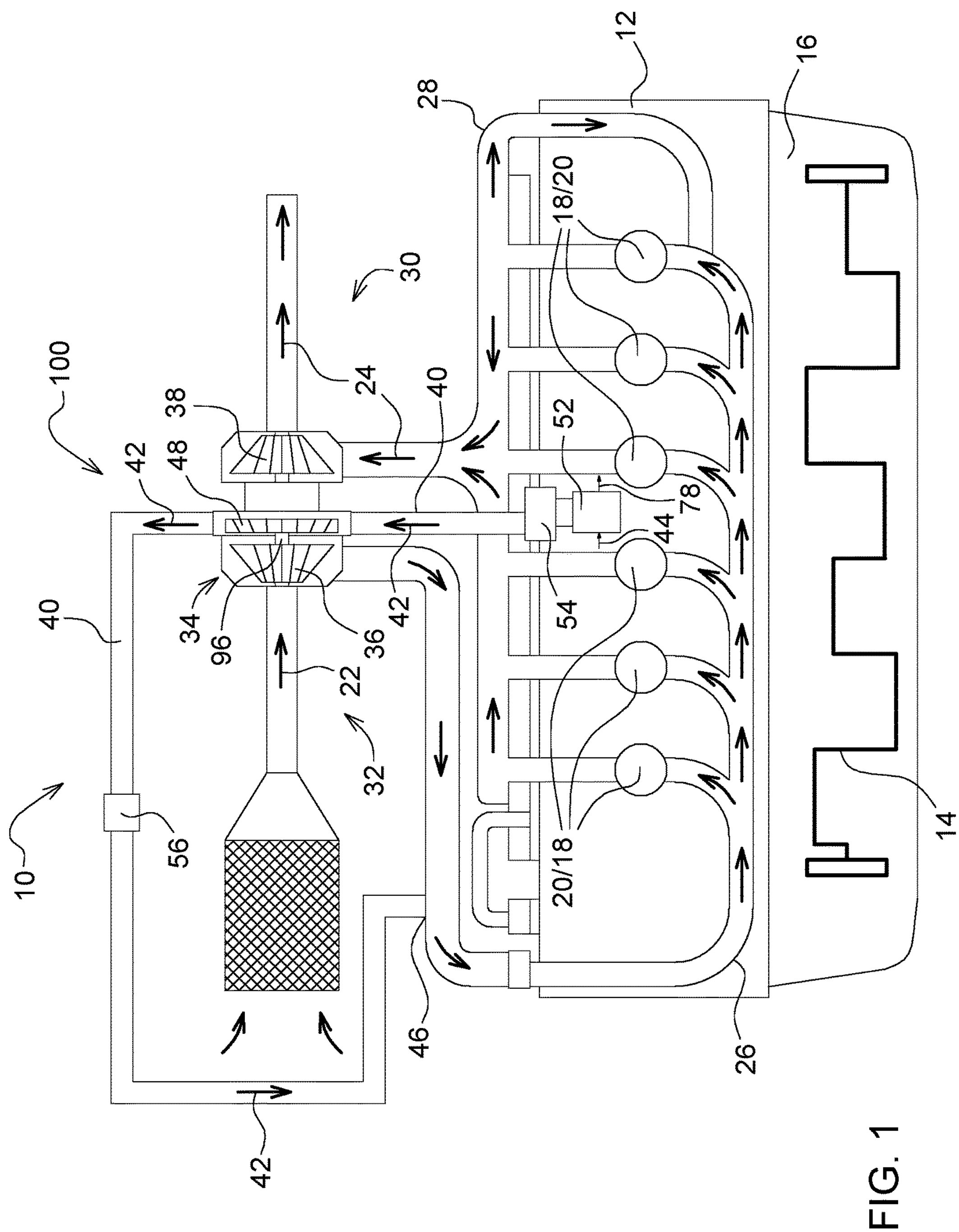
FIG. 1 illustrates an internal combustion engine and a crankcase ventilation system in accordance with one or more embodiments of the present disclosure.

Reference is now made to FIG. 1, which illustrates an internal combustion engine 10 and a crankcase ventilation system 100 in accordance with one or more embodiments of the present disclosure. The engine 10 includes a block 12 containing or including a crankshaft 14 and a crankcase 16 surrounding or otherwise disposed around the crankshaft 14. The engine 10 further includes a plurality of cylinders 18, each having a combustion chamber 20 configured to receive an intake fluid 22 and generate an exhaust fluid 24, such as, in a non-limiting example, an exhaust gas formed by combustion of a fuel mixed with the intake fluid 22 in the combustion chamber 20. The fuel may be supplied via one or more fuel injector(s) (not shown). The intake fluid 22 may include a fuel and/or another liquid or gaseous material. The engine 10 of the illustrated embodiment includes an intake manifold 26 through which the intake fluid 22 flows and an exhaust manifold 28 through which the exhaust fluid 24 flows.

The engine 10 further includes an exhaust circuit 30 configured to direct the exhaust fluid 24 away from the combustion chambers 20. The engine 10 further includes an intake circuit 32 configured to supply the intake fluid 22 to the combustion chambers 20. The engine 10 illustrated in FIG. 1 includes a turbocharger 34 having a turbine 36 disposed in the exhaust circuit 30. The turbine 36 includes a turbine shaft 96 configured to be rotated or otherwise driven by the exhaust fluid 24. In an embodiment, the turbocharger 34 of the engine 10 includes a compressor 38 disposed in the intake circuit 32 propelling the intake fluid 22 to the combustion chambers 20. The compressor 38 illustrated in FIG. 1 is directly coupled to the turbine 36. In one or more additional embodiments, the engine 10 does not include the compressor 38, the turbine 36 is not directly coupled to the compressor 38, the turbine 36 is rotationally coupled to a motor/generator and/or the compressor 38 is rotationally coupled to a motor/generator.

The engine 10 and system 100 of FIG. 1 includes a crankcase ventilation circuit 40 configured to direct a crankcase fluid 42 away from the crankcase 16. The crankcase ventilation circuit 40 extends from a crankcase ventilation circuit inlet 44 disposed at the crankcase 16 to a crankcase ventilation circuit outlet 46.

The engine 10 and the system 100 illustrated in the embodiment of FIG. 1 includes a crankcase ventilation circuit outlet 46 disposed at the intake circuit 32 downstream from the compressor 38 such that the crankcase fluid 42 is propelled from the crankcase 16 to the intake circuit 32 through the crankcase ventilation circuit 40. Accordingly, the crankcase fluid 42 in the engine 10 and the system 100 of FIG. 1 returns to the engine 10 through the intake circuit 32 in a closed crankcase ventilation system.

Figure 2:
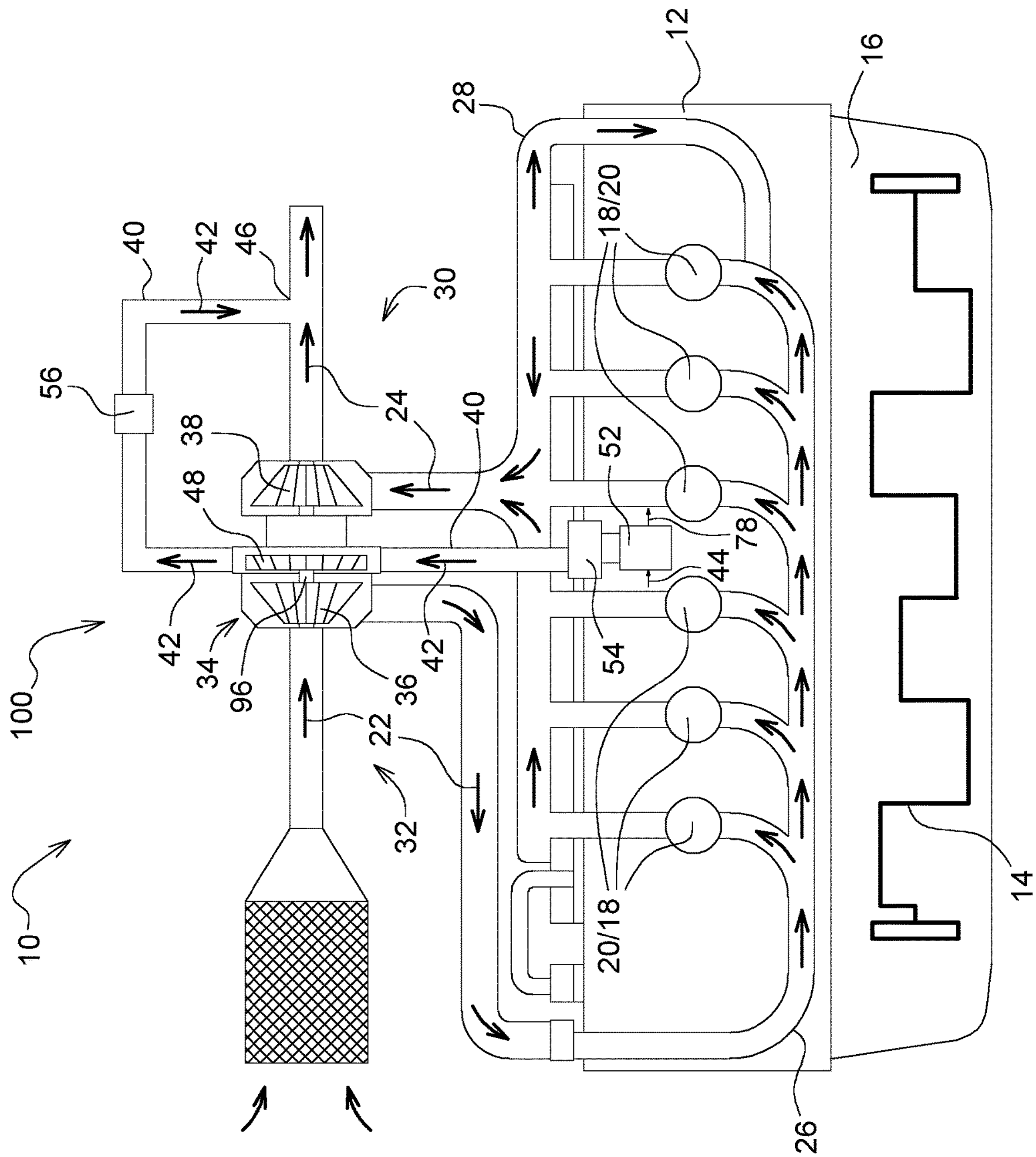
FIG. 2 illustrates an internal combustion engine and a crankcase ventilation system in accordance with one or more embodiments of the present disclosure.

Referring now to FIG. 2, the crankcase ventilation circuit outlet 46 of an embodiment is disposed at the exhaust circuit 30 downstream of the turbine 36 such that the crankcase fluid 42 is propelled from the crankcase 16 to the exhaust circuit 30 through the crankcase ventilation circuit 40. Accordingly, the crankcase fluid 42 in the engine 10 and the system 100 of FIG. 2 is directed away from the engine 10 through the exhaust circuit 30 in an open crankcase ventilation system.

Figure 3:
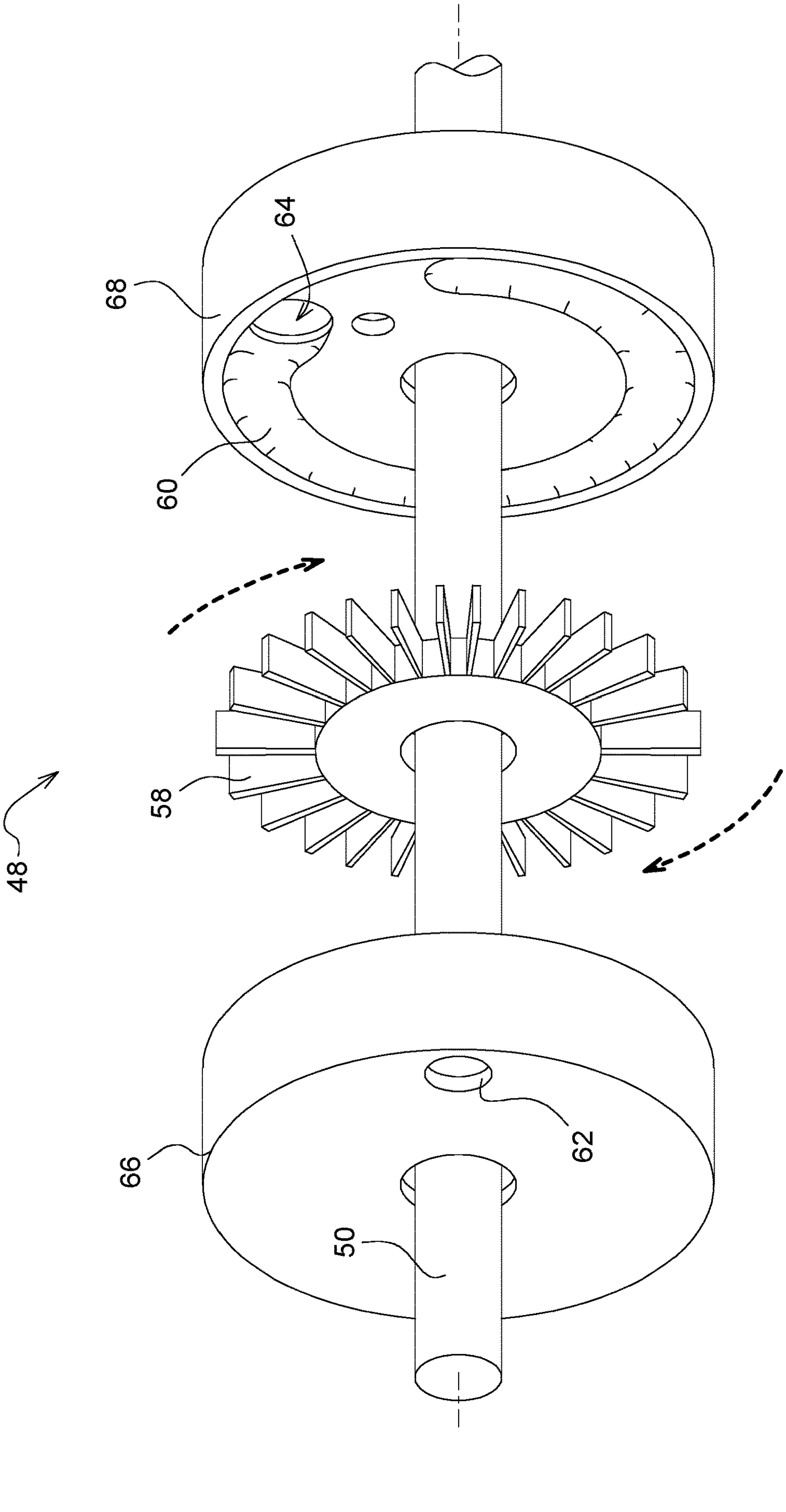
FIG. 3 illustrates a pump in accordance with one or more embodiments of the present disclosure.

Referring now to FIG. 3 with ongoing reference to FIGS. 1 and 2, a pump 48 is disposed in the crankcase ventilation circuit 40. The pump 48 includes a rotor 50 or other working component including, without limitation, an impeller 58 or other component configured to impart fluid motion to the crankcase fluid 42. The pump 48 illustrated in FIG. 3 includes a volute 60 or similar flow channel disposed between a first pump housing member 66 and a second pump housing member 68, an inlet port 62, and a discharge port 64. The rotor 50 and/or the impeller 58 is/are configured to be directly or indirectly rotated by, driven by, or otherwise powered by the turbine shaft 96 to propel the crankcase fluid 42 through the crankcase ventilation circuit 40. In additional embodiments not illustrated, the rotor 50 or the pump 48 is not powered by the turbine 36 or another portion of the turbocharger 34, but is instead powered by electrical, hydraulic, pneumatic, belt, gear, or other mechanical means. In the illustrated embodiment, the rotor 50 is directly coupled to the turbine shaft 96. In additional embodiments not illustrated, the rotor 50 may be powered indirectly by the turbine shaft 96 such as by, in non-limiting examples, electrical, pneumatic, hydraulic, or indirect mechanical connection between the turbine shaft 96 and the rotor 50 and/or another component of the pump 48. In one or more additional embodiments not illustrated, the pump 48 may be or include another structure and/or may operate under a different principle, including without limitation a peristaltic, diaphragm, Roots-type, Moineau-type, gear, gerotor, piston, or other type of centrifugal flow, axial flow, positive displacement, reciprocating, or other pump type.

In order to handle the crankcase fluid 42, the rotor 50, the impeller 58, the volute 60, and/or another portion of the pump 48 and/or other component of the crankcase ventilation circuit 40 of one or more embodiments includes one or more corrosion resistant materials, coatings, and/or treatments, such as certain components being made from stainless steel in a non-limiting example. Additionally, in one or more additional embodiments, the pump 48 and/or another component of the crankcase ventilation circuit 40 includes one or more gaseous or liquid heat exchangers, such as, in non-limiting examples, air, water, or coolant jackets, passages, fins, or features, in order to cool the pump 48 and/or other component and prevent or reduce coking of the crankcase fluid 42.

Figure 4:
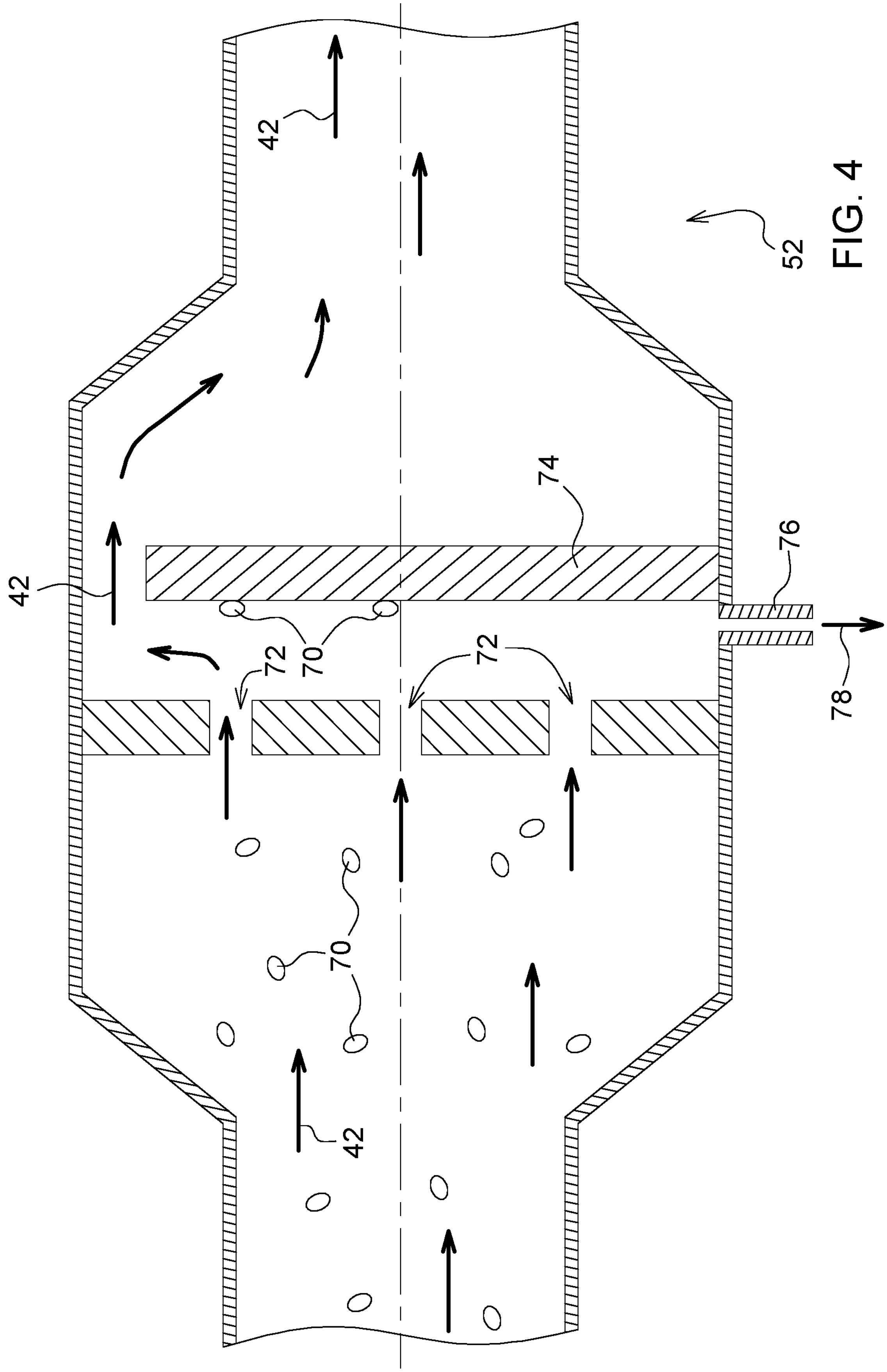
FIG. 4 illustrates a separator in accordance with one or more embodiments of the present disclosure.

Referring now to FIG. 4 with ongoing reference to FIGS. 1 and 2, the engine 10 further includes a separator 52 disposed in the crankcase ventilation circuit 40. As illustrated in FIG. 4, the separator 52, such as an impactor separator in a non-limiting example, is configured to remove a lubricant, such as oil droplets 70 in a non-limiting example, from the crankcase fluid 42 as the crankcase fluid 42 is directed through the crankcase ventilation circuit 40. The separator 52 of the embodiment illustrated in FIG. 4 includes nozzles 72 or other passage(s) upstream of an impactor surface 74, such as a fleece impactor surface in a non-limiting example, and a lubricant drain 76 disposed between the nozzles 72 and the impactor surface 74. In the embodiment illustrated in FIG. 4, the crankcase fluid 42 having oil droplets 70 flows through the nozzles 72 before impinging upon or otherwise contacting the impactor surface 74. The oil droplets 70 accumulate on the impactor surface 74 and fall by gravity or are otherwise directed to the lubricant drain 76. The crankcase fluid 42 flows downstream of the impactor surface 74 with oil droplets 70 removed from the crankcase fluid 42. The oil or lubricant that reaches the lubricant drain 76 is returned to the engine 10 via a lubricant circuit 78. The separator 52 of additional embodiments not illustrated is or includes, in non-limiting examples, one or more baffle(s), blowby driven impactor(s), variable blowby driven impactor(s), cyclonic impactor(s), rotating coalescing filter(s), or centrifugal hydraulically or electrically driven or boost driven separator(s).

The separator 52 of the illustrated embodiments is disposed upstream of the pump 48 in the crankcase ventilation circuit 40. The separator 52 reduces or prevents oil droplets 70 reaching the pump 48, another component in the crankcase ventilation circuit 40, and/or the intake circuit 32 or the exhaust circuit 30, depending on the arrangement of the crankcase ventilation circuit 40. Such prevention or reduction via the separator 52 improves the efficiency, durability, and performance of the pump 48 and other components of the engine 10 and the system 100.

Figure 5:
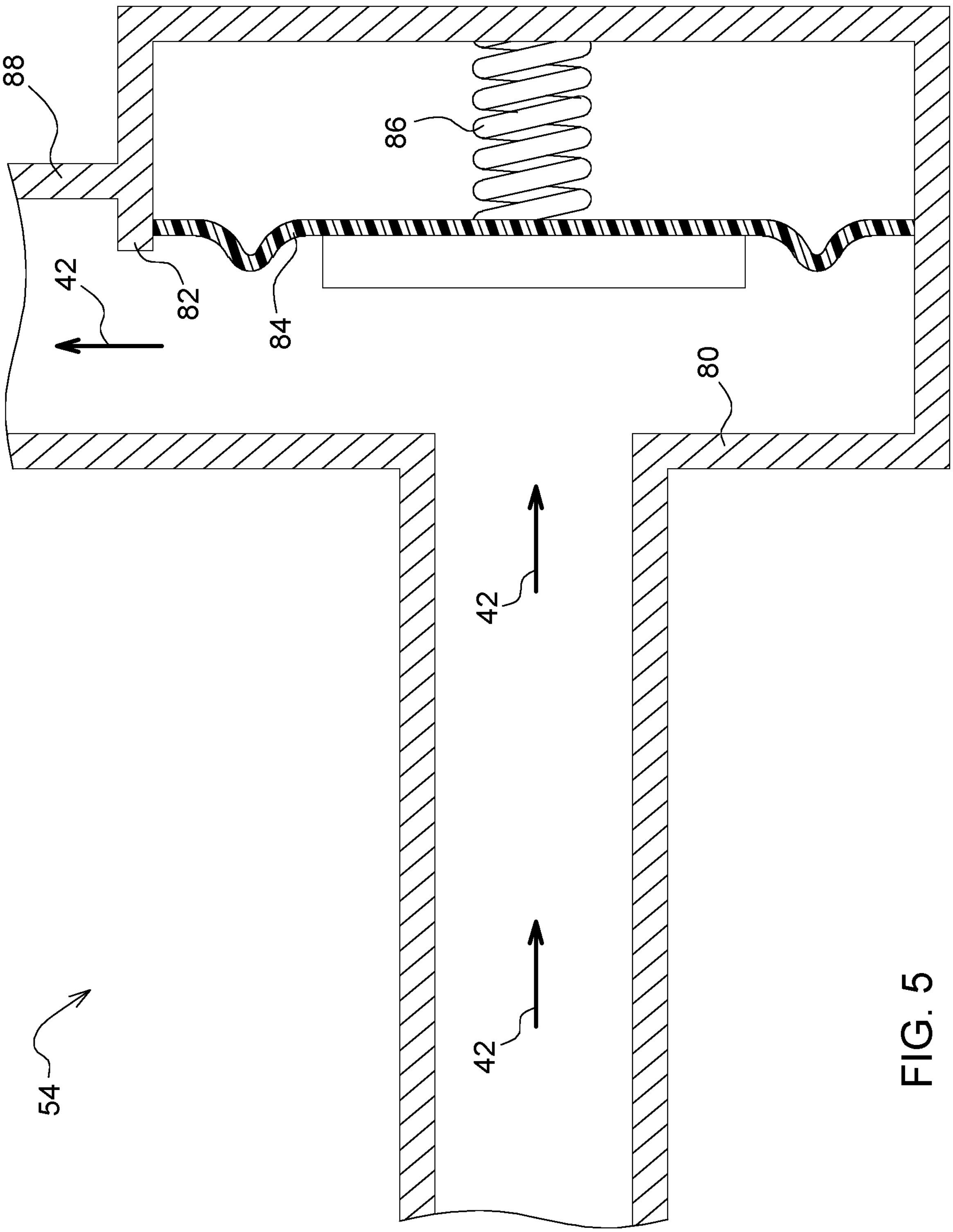
FIG. 5 illustrates a regulator in accordance with one or more embodiments of the present disclosure.

Referring now to FIG. 5 with continuing reference to FIG. 1, a regulator 54 is disposed in the crankcase ventilation circuit 40. The regulator 54 is a crankcase pressure regulator in an embodiment configured to regulate the pressure of the crankcase fluid 42 in the crankcase 16. In the non-limiting example of the regulator 54 illustrated in FIG. 5, the regulator 54 is a crankcase depression regulator that includes a regulator housing 88, a regulator inlet 80, a regulator outlet 82, a regulator diaphragm 84, and a spring 86. However, one will appreciate that the regulator 54 of additional embodiments includes alternative structure or operation configured to regulate the pressure of the crankcase 16. The regulator 54 is disposed upstream of the pump 48 in the crankcase ventilation circuit 40.

During operation of an embodiment, as the speed of the turbine shaft 96 and/or the rotor 50 increases, the regulator 54 actuates toward closing the crankcase ventilation circuit 40 in order to maintain the flow rate in the crankcase ventilation circuit 40. Such actuation of the regulator 54 varies in one or more embodiments depending upon altitude of the engine 10 during operation, engine load, and/or one or more additional factors or conditions. Further, in an additional embodiment, a crankcase pressure sensor (not shown) may be provided to send feedback, such as to a controller, for operation of an electronically controlled regulator.

The engine 10 of one or more embodiments further includes a check valve 56 disposed in the crankcase ventilation circuit 40. The check valve 56 is configured to prevent a reverse flow direction of the crankcase fluid 42 from the crankcase ventilation circuit outlet 46 toward the pump 48. In other words, the check valve 56 allows flow of the crankcase fluid 42 from the pump 48 through the check valve 56 but prevents flow of the crankcase fluid 42 in a direction toward the pump 48 and/or the crankcase 16. The check valve 56 in an embodiment is disposed downstream of the pump 48 in the crankcase ventilation circuit 40. The check valve 56 in additional embodiments is disposed upstream of the pump 48 or at another location in the crankcase ventilation circuit 40. In the embodiment(s) that may include an electronically controlled regulator, the check valve 56 may be omitted.

The engine 10 and the system 100 of the embodiments described herein provide crankcase ventilation for crankcase fluid 42, such as blowby gases, generated within the engine 10. More particularly, the pump 48 and/or other components of the engine 10 and the system 100 allow the crankcase fluid 42 to be circulated as a gas to a location having a higher pressure than a pressure in the crankcase 16. In embodiments where the crankcase ventilation circuit outlet 46 is located in the intake circuit 32, the engine 10 and the system 100 provide a closed crankcase ventilation system that circulates the crankcase fluid 42 downstream of the compressor 38 to avoid introducing the crankcase fluid 42 to the compressor 38 and thereby causing adverse effects to the compressor 38 or its performance. Likewise, in embodiments where the crankcase ventilation circuit outlet 46 is located in the exhaust circuit 30, the engine 10 and the system 100 provide an open or semi-open crankcase ventilation system that circulates the crankcase fluid 42 downstream of the turbine 36 to avoid introducing the crankcase fluid 42 to the turbine 36 and thereby causing adverse effects to the turbine 36 or its performance.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment (s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. An internal combustion engine comprising:

a block containing a crankshaft and a crankcase surrounding the crankshaft;

a plurality of combustion chambers configured to receive an intake fluid and generate exhaust fluid;

an exhaust circuit configured to direct the exhaust fluid away from the plurality of combustion chambers;

an intake circuit configured to supply the intake fluid to the plurality of combustion chambers;

a turbine disposed in the exhaust circuit and having a turbine shaft configured to be driven by the exhaust fluid;

a crankcase ventilation circuit configured to direct crankcase fluid away from the crankcase; and a pump disposed in the crankcase ventilation circuit and having a rotor configured to be driven by the turbine shaft to propel the crankcase fluid through the crankcase ventilation circuit.

2. The internal combustion engine of claim 1, further comprising a compressor disposed in the intake circuit propelling the intake fluid to the plurality of combustion chambers.

3. The internal combustion engine of claim 2, further comprising a crankcase ventilation circuit outlet disposed at the intake circuit downstream from the compressor such that the crankcase fluid is propelled from the crankcase to the intake circuit through the crankcase ventilation circuit.

4. The internal combustion engine of claim 1, further comprising a separator disposed in the crankcase ventilation circuit and configured to remove a lubricant from the crankcase fluid as the crankcase fluid is directed through the crankcase ventilation circuit.

5. The internal combustion engine of claim 4, wherein the separator is disposed upstream of the pump in the crankcase ventilation circuit.

6. The internal combustion engine of claim 1, further comprising a regulator disposed in the crankcase ventilation circuit and configured to regulate the pressure of the crankcase fluid in the crankcase.

7. The internal combustion engine of claim 6, wherein the regulator is disposed upstream of the pump in the crankcase ventilation circuit.

8. The internal combustion engine of claim 1, further comprising a check valve disposed in the crankcase ventilation circuit and configured to prevent a reverse flow direction of the crankcase fluid from the crankcase ventilation circuit outlet toward the pump.

9. The internal combustion engine of claim 8, wherein the check valve is disposed downstream of the pump in the crankcase ventilation circuit.

10. The internal combustion engine of claim 1, further comprising a crankcase ventilation circuit outlet disposed at the exhaust circuit downstream of the turbine such that the crankcase fluid is propelled from the crankcase to the exhaust circuit through the crankcase ventilation circuit.

11. A crankcase ventilation system configured to ventilate a crankcase in an internal combustion engine having a turbine, the crankcase ventilation system comprising:

a crankcase ventilation circuit configured to direct crankcase fluid away from the crankcase;

a pump disposed in the crankcase ventilation circuit and having a rotor being configured to be driven by the turbine to propel the crankcase fluid through the crankcase ventilation circuit;

a check valve disposed in the crankcase ventilation circuit downstream of the pump and being configured to prevent a reverse flow direction of the crankcase fluid toward the pump; and a separator disposed in the crankcase ventilation circuit and configured to remove a lubricant from the crankcase fluid as the crankcase fluid is directed through the crankcase ventilation circuit.

12. The system of claim 11, wherein the separator is disposed in the crankcase ventilation circuit upstream of the pump.

13. The system of claim 11, further comprising a crankcase ventilation circuit outlet configured to be positioned at an intake circuit downstream of a compressor propelling an intake fluid in the intake circuit, wherein the crankcase fluid is propelled from the crankcase to the intake circuit through the crankcase ventilation circuit.

14. The system of claim 11, further comprising a crankcase ventilation circuit outlet configured to be positioned at an exhaust circuit downstream of the turbine, wherein the crankcase fluid is configured to be propelled from the crankcase to the exhaust circuit through the crankcase ventilation circuit.

15. A crankcase ventilation system configured to ventilate a crankcase in an internal combustion engine having a turbine, a compressor propelling intake fluid to the internal combustion engine, and an intake circuit configured to supply the intake fluid to the internal combustion engine, the crankcase ventilation system comprising:

a crankcase ventilation circuit configured to direct crankcase fluid away from the crankcase;

a pump disposed in the crankcase ventilation circuit and having a rotor configured to be driven by the turbine to propel the crankcase fluid through the crankcase ventilation circuit, wherein the rotor includes an impeller configured to impart fluid motion to the crankcase fluid; and a crankcase ventilation circuit outlet being configured to be disposed at the intake circuit downstream from the compressor such that the crankcase fluid is propelled from the crankcase to the intake circuit through the crankcase ventilation circuit.

16. The system of claim 15, further comprising a check valve disposed in the crankcase ventilation circuit and configured to prevent a reverse flow direction of the crankcase fluid from the crankcase ventilation circuit outlet toward the crankcase.

17. The system of claim 15, wherein the compressor, turbine, and impeller are coaxial.

18. A crankcase ventilation system configured to ventilate a crankcase in an internal combustion engine having a turbine disposed in an exhaust circuit configured to direct exhaust fluid away from the internal combustion engine, the crankcase ventilation system comprising:

a crankcase ventilation circuit configured to direct crankcase fluid away from the crankcase;

a pump disposed in the crankcase ventilation circuit and having a rotor configured to be driven by the turbine to propel the crankcase fluid through the crankcase ventilation circuit, wherein the rotor includes an impeller configured to impart fluid motion to the crankcase fluid; and a crankcase ventilation circuit outlet configured to be disposed at the exhaust circuit downstream of the turbine such that the crankcase fluid is propelled from the crankcase to the exhaust circuit through the crankcase ventilation circuit.

19. The system of claim 18, further comprising a check valve disposed in the crankcase ventilation circuit and configured to prevent a reverse flow direction of the crankcase fluid from the crankcase ventilation circuit outlet toward the crankcase.

20. The system of claim 18, wherein the turbine and impeller are coaxial.

* * * * *